United States Patent [19]
Joyce, Jr.

[11] 3,756,343
[45] Sept. 4, 1973

[54] AIR CUSHION SEAL
[75] Inventor: Douglas D. Joyce, Jr., Williamsville, N.Y.
[73] Assignee: Textron Inc., Providence, R.I.
[22] Filed: Sept. 2, 1971
[21] Appl. No.: 177,354

[52] U.S. Cl. .................................. 180/127, 180/124
[51] Int. Cl. .............................................. B60v 1/16
[58] Field of Search ..................... 180/127, 128, 124

[56] References Cited
UNITED STATES PATENTS

| 3,478,836 | 11/1969 | Eckered et al. | 180/128 |
| 3,291,237 | 12/1966 | Hopkins et al. | 180/127 |
| 3,363,717 | 1/1968 | Hunt | 180/128 |
| 3,265,144 | 8/1966 | Shaw | 180/127 |
| 3,384,197 | 5/1968 | Bingham et al. | 180/128 X |
| 3,397,753 | 8/1968 | Hunt et al. | 180/127 |
| 3,362,499 | 1/1968 | Tripp | 180/128 X |

FOREIGN PATENTS OR APPLICATIONS

| 203,252 | 3/1966 | Sweden | 180/128 |

Primary Examiner—Kenneth H. Betts
Assistant Examiner—John P. Silverstrim
Attorney—John B. Bean et al.

[57] ABSTRACT
There is disclosed herein an improved seal device for air-cushion vehicles, surface effect ships, or the like; consisting of a plurality of discrete, vertically elongate, closed, bucket-shaped cell members which are disposed serially in side-by-side free-sliding relation, and which are formed of flexible fabric and are inflated to pressures greater than the associated air-cushion pressure. At their upper ends the cells are firmly affixed to the vehicle structure so as to extend therebelow in cantilever mounted relation, and in side view are of acute angle form terminating in apex configurations at their bottom ends. Thus the cells are individually deformable, but are pneumatically resilient; and due to their higher pressured condition automatically spring back and return to their normal configurations after being deflected when passing over obstacles or waves with more positive control of the transiently confined air cushion than within the capabilities of prior air-cushion sealing devices. The cell members are preferably mounted relative to the "hard" frame or hull structure of the vehicle so as to splay outwardly from the vertical view perimeters thereof; thereby enhancing the non-scooping and non-snagging performance of the system, while also increasing the air-cushion area relative to the "hard" structure. Thus, the invention operates more efficiently and with a greatly reduced drag effect (attendant frictional contacts with the surface over which the vehicle is travelling) due to the shape of the cell members as well as to their angle of contact with the reaction surface.

7 Claims, 3 Drawing Figures

PATENTED SEP 4 1973　　　　　　　　　　　　　　3,756,343
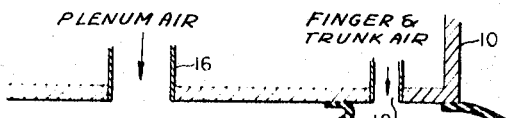
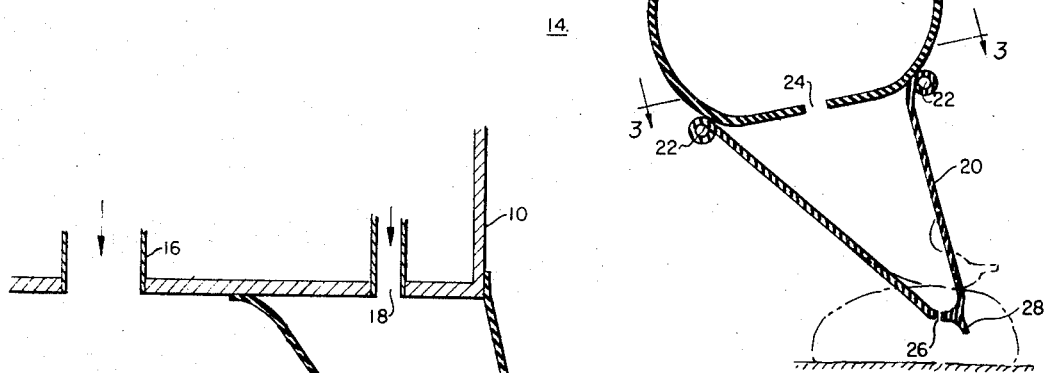
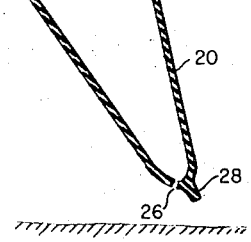
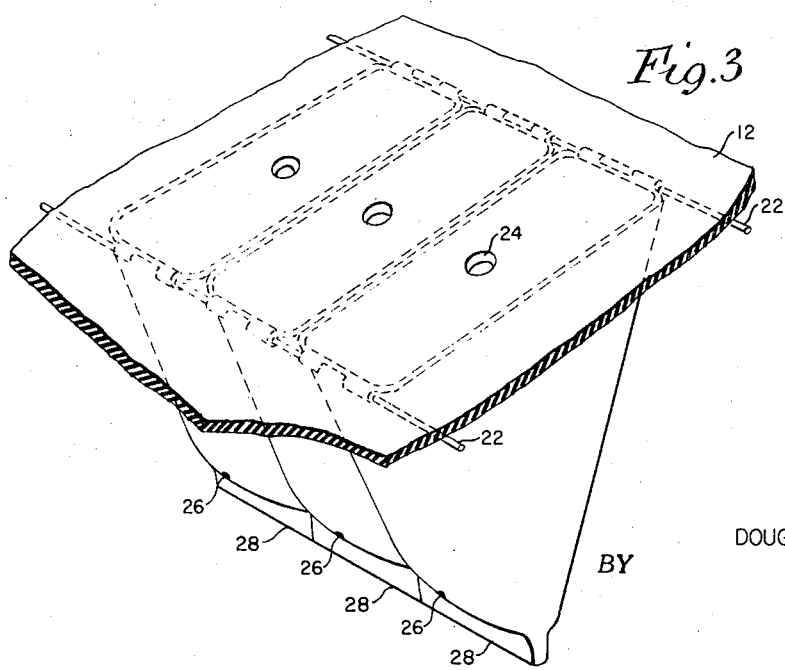
INVENTOR.
DOUGLAS D. JOYCE, JR.
BY　*Bean + Bean*
ATTORNEYS

AIR CUSHION SEAL

BACKGROUND OF THE INVENTION

The invention relates to vehicles of the type which are supported at least in part by transient cushions of air; such vehicles being generally referred to in the industry as "air-cushion vehicles" or "surface effect vehicles" or "surface effect ships". In order to retain the support cushion of air under such vehicles they typically employ, at least in part, some form of sealing device which is fabricated of flexible material depending below the vehicle toward the reaction surface. The present invention relates specifically to improvements in air cushion seal devices for use in air-cushion vehicles of the types such as are disclosed for example in U.S. Pat. Nos. 3,397,753; 3,384,198; 3,327,800 and 3,532,179.

GENERAL DESCRIPTION OF THE INVENTION

In accordance with the invention an air cushion sealing system is provided in the form of a plurality of side-by-side serially arrayed pocket-shaped closed cells which are fabricated of flexible air-tight sheet material, and are slim in end view and are disposed peripherally below the vehicle so as to comprise the "hem" portion of the air cushion confining device. These cells may be attached to subtend directly from the vehicle frame or hull, or from an air-inflated trunk extending therefrom. In any case the cells are firmly attached at their upper ends to their support structure so as to extend in cantilever relation therefrom, thereby comprising in combination therewith an improved air cushion sealing system.

The cells are arranged to receive air under somewhat higher pressure than exists within the air cushion space under the vehicle, whereby each cell comprises a pneumatically inflated and distended box-beam like device. The cells are relatively disposed so as to normally stand in close-fitting side-by-side relation, thus cooperating to form an air-cushion sealing barrier comprising "fingers" or cells which are individually free to buckle and slide sidewise against each other and to deflect away from their normal attitudes and configurations whenever they collide against resistant obstacles. Thus, the invention provides an air cushion vehicle having improved air-cushion sealing characteristics compared to conventional skirt or trunk systems when travelling over uneven ground and/or wavy water surfaces, while also resulting in less drag effects relative to the reaction surface. The seal system of the invention not only operates with improved efficiency, but also provides a more stable and therefore smoother ride over waves or rough ground, with less attendant wear and tear on the seal device fabrications.

THE DRAWING

Preferred embodiments of the invention are illustrated by the accompanying drawing wherein:

FIG. 1 is a fragmentary vertical sectional view through a typical improved air cushion arrangement of the present invention; showing the side view configuration of one of the cell members;

FIG. 2 corresponds to FIG. 1 of another form of air cushion arrangement; and

FIG. 3 is a fragmentary perspective view of a portion of the sealing system, taken as suggested by line 3—3 of FIG. 1.

As illustrated by way of example at FIG. 1 of the drawing herewith, the invention may be embodied in an air-cushion vehicle comprising a "hard" hull or frame structure designated generally at 10 mounting peripherally thereof an inflatable trunk 12; thereby defining beneath the vehicle the vehicle air lift cushion space as designated 14. The hull structure supports the vehicle operative components such as the lift air fan and propulsion engine drive units; the pilot compartment; and the like. As is well known, one or more fans may be employed to supply the transient air cushion beneath the vehicle; the fan or fans discharging through one or more ducts as indicated at 16. As shown at 18, in accordance with the present invention a separate source of compressed air is supplied to inflate the trunk system 12; this air being supplied at substantially higher pressure than the air discharged into the cushion chamber 14.

Furthermore in accordance with the present invention, the trunk 12 is subtended by a series of bucket-shaped cells 20 which are formed of flexible, substantially airtight, film or fabric sheet material. The cells 20, as best shown at FIG. 3, are invert-pyramid shaped, and are attached at their upper open end portions to the trunk structure 12 in such manner that the cells depend from the trunk in side-by-side close-fitting relation. The cells 20 may be attached to the trunk by any suitable means, such as for example by hinge pin devices 22 as shown herein; or, the cells may be fixed at their upper ends by means of any other suitable fastening devices so as to be readily removable for replacement/repair purposes. In any case, each cell will be thereby individually attached at its upper open end portion to the trunk fabric so as to extend downwardly therefrom in cantilever mounted relation.

FIG. 2 illustrates how the devices of the invention may be mounted directly upon the hard hull structure 10 of the vehicle, in lieu of being arranged to extend from an inflated trunk as shown at 12 (FIGS. 1, 3). Note that in either case it is preferred to dispose the cell devices 20 so as to incline outwardly (in plan view) from the bottom perimeter of the vehicle hull structure. This arrangement not only increases the air cushion area under the vehicle when the cell devices 20 are inflated, but also disposes their lower tip end portions at an improved attitude relative to the reaction surface, thereby facilitating their ability to "ride" solid obstacles, waves, and the like. Also, because the cells 20 are of acute angle form in side view (FIGS. 1, 2) the arrangement provides an improved non-scooping and non-snagging operational characteristic. This is because the lower tip end portions of the cells have no fabric loop characteristic such as would otherwise cause them to be self-supporting in any direction; whereby they may readily collapse when under deflection loadings incidental to moving over obstacles in any direction.

The trunk fabric is apertured as indicated at 24 so as to provide free flow of the higher pressured air from the trunk into each one of the cells 20. The cells 20 are of air-pressure containing and closed form with the exception that a small water drain hole is preferably provided at the bottom of each cell as indicated at 26; whereby, when the machine is operative the cells are pneumatically inflated so as to be individually independent box-beam like devices arrayed in side-by-side relation below the trunk 12. However, because of the flexible nature of the fabric comprising the cell members, they are constituted so as to individually respond to abutting contacts with obstacles (such as rocks lying on a ground surface over which the vehicle is travelling (see FIG. 1); or, rough water waves, or the like) by buckling and thereupon readily wiping over the obstacle. Such deflections of the cell members from their "normal" attitudes are readily accommodated by the fact that the cells are arranged in free-sliding relation against each other; and also because the flexible fabric of the trunk device permits the area of the trunk device which carries any deflecting cell to flex relative to other adjacent areas of the trunk fabric.

The cell members 20 may be fabricated of any suitable flexible material, and in any preferred manner. For example, they may be fabricated of rubberized cloth, or plastic sheeting; or they may be molded of any suitable rubber or plastic material; and in any case will preferably be formed to terminate at their bottom ends in a flat flap portion as shown at 28, which provides an improved motion-stabilizing "planing" action of the extreme ends of the cell members relative to the reactive ground or water surface. Furthermore, it is to be particularly noted that in side view the cells are formed with acute apex angles, which is a factor requisite to providing the cells with the necessary buckling and deflecting capabilities, as explained hereinabove. In the absence of this feature the cells would in effect be rigid against buckling and deflection responses to obstacles such as described hereinabove; and therefore would be inoperative in accordance with the concept of the present invention.

I claim:

1. In an air-cushion vehicle wherein the air cushion cavity air is contained under relatively low pressure at least in part by a flexible wall structure attached to and depending below the hard structure of the vehicle body, said wall structure comprising a succession of individual, separately formed, cell members arrayed in side-by-side, slide-abutting cooperating air-sealing relationship, while being individually deformable independently of one another in response to obstacle impacts; the improvements comprising:

each of said cell members being V-shaped in side view and having opposed inner and outer wall portions which converge to an apex bottom portion in downward directions in an acute angle relationship defining an included angle sufficiently acute as to allow the cell independently to deflect when it strikes an obstacle without scooping and without excessive drag;

a source of relatively high pressure air;

the interiors of said cell members being in open communication with said source of a relatively high pressure air and said source including means for maintaining pressure in said cells in amount sufficient continuously to stiffen them into pneumatically resilient box-beam configurations during operation of the vehicle; and said cell members being cantilever-beam connected at their upper ends to said vehicle.

2. A vehicle as set forth in claim 1 wherein said included angle is in the neighborhood of a 45° angle.

3. A vehicle as set forth in claim 1 wherein the apex bottom portions of said cell members terminate in outwardly extending flap formations.

4. A vehicle as set forth in claim 1 wherein said cell members are disposed to splay outwardly from their upper end connections to the vehicle structure.

5. A vehicle as set forth in claim 1 wherein the separate cell members are attached to extend downwardly from the hard structure of said vehicle.

6. A vehicle as set forth in claim 1 wherein said cell members are separately attached to and extend downwardly from an inflatable trunk device disposed intermediately of the vehicle hard structure and said cell members.

7. A vehicle as set forth in claim 1 wherein water drain-out apertures are provided through the walls of said cells adjacent the bottoms thereof.

* * * * *